US012694492B2

(12) United States Patent
Chen

(10) Patent No.: US 12,694,492 B2
(45) Date of Patent: Jul. 28, 2026

(54) VISUAL ANALYSIS METHODS AND APPARATUSES FOR IMAGE INPAINTING MODELS, AND ELECTRONIC DEVICES

(71) Applicant: BOE Technology Group Co., Ltd., Beijing (CN)

(72) Inventor: Yusi Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/574,300

(22) PCT Filed: Nov. 7, 2022

(86) PCT No.: PCT/CN2022/130284
§ 371 (c)(1),
(2) Date: Dec. 26, 2023

(87) PCT Pub. No.: WO2024/098188
PCT Pub. Date: May 16, 2024

(65) Prior Publication Data
US 2025/0265686 A1     Aug. 21, 2025

(51) Int. Cl.
*G06T 5/50*          (2006.01)
*G06T 5/20*          (2006.01)
(Continued)

(52) U.S. Cl.
CPC .................. *G06T 5/77* (2024.01); *G06T 5/20* (2013.01); *G06T 5/50* (2013.01); *G06T 5/73* (2024.01)

(58) Field of Classification Search
CPC .... G06T 5/77; G06T 5/20; G06T 5/50; G06T 5/73; G06T 2207/20084; G06T 5/60
See application file for complete search history.

(56) References Cited

U.S. PATENT DOCUMENTS

2011/0103706 A1 * 5/2011 Jeong ................... G06T 11/001
382/254
2015/0279003 A1 * 10/2015 Higaki .................. G06V 10/60
382/254
(Continued)

FOREIGN PATENT DOCUMENTS

AU        2020100196 A4      3/2020
CN        110288036 A       9/2019
(Continued)

OTHER PUBLICATIONS

PCT/CN2022/130284 international search report.
PCT/CN2022/130284 Written Opinion.

*Primary Examiner* — Samir A Ahmed
(74) *Attorney, Agent, or Firm* — IPro, PLLC

(57) ABSTRACT

The present disclosure provides a visual analysis method and apparatus for an image inpainting model, and an electronic device. The method includes: obtaining a benchmark image and a plurality of interpolation images corresponding to a to-be-restored image, where the to-be-restored image includes a target region to be restored; inputting the to-be-restored image, the benchmark image and the plurality of the interpolation images as input images into the image inpainting model, to obtain a restored image corresponding to each of the input images; obtaining an attribution value of the target region in the restored image corresponding to each of the input images; based on the attribution value, obtaining an activation image corresponding to each of the input images, where the activation image includes a response value of each pixel in an input image contributing to the attribution value.

12 Claims, 6 Drawing Sheets

Obtain a benchmark image corresponding to a to-be-restored image and a plurality of interpolation images corresponding to the to-be-restored image, where the to-be-restored image comprises a target region to be restored — 11

Respectively input the to-be-restored image, the benchmark image and the plurality of the interpolation images as input images into the image inpainting model, to obtain a restored image corresponding to each of the input images — 12

Obtain an attribution value of the target region in the restored image corresponding to each input image — 13

Based on the attribution value, obtain an activation image corresponding to each input image, where the activation image comprises a response value of each pixel in the input image contributing to the attribution value — 14

Perform visual analysis based on the activation image corresponding to each of the input images and the restored image corresponding to the to-be-restored image, to obtain a visual analysis result — 15

(51) Int. Cl.
   *G06T 5/73* (2024.01)
   *G06T 5/77* (2024.01)

(56) References Cited

U.S. PATENT DOCUMENTS

| | | | |
|---|---|---|---|
| 2022/0292650 A1* | 9/2022 | Amirghodsi | ........... G06N 3/094 |
| 2022/0375050 A1* | 11/2022 | Kong | ........................ G06T 7/90 |

FOREIGN PATENT DOCUMENTS

| | | |
|---|---|---|
| CN | 110826699 A | 2/2020 |
| CN | 110874824 A | 3/2020 |
| CN | 112085670 A | 12/2020 |
| CN | 112884021 A | 6/2021 |
| CN | 113743584 A | 12/2021 |
| CN | 113792789 A | 12/2021 |
| CN | 114330109 A | 4/2022 |
| CN | 114820299 A | 7/2022 |
| JP | 2007148945 A | 6/2007 |

* cited by examiner

Obtain a benchmark image corresponding to a to-be-restored image and a plurality of interpolation images corresponding to the to-be-restored image, where the to-be-restored image comprises a target region to be restored    ⌇11

Respectively input the to-be-restored image, the benchmark image and the plurality of the interpolation images as input images into the image inpainting model, to obtain a restored image corresponding to each of the input images    ⌇12

Obtain an attribution value of the target region in the restored image corresponding to each input image    ⌇13

Based on the attribution value, obtain an activation image corresponding to each input image, where the activation image comprises a response value of each pixel in the input image contributing to the attribution value    ⌇14

Perform visual analysis based on the activation image corresponding to each of the input images and the restored image corresponding to the to-be-restored image, to obtain a visual analysis result    ⌇15

FIG. 1

FIG. 2

Filter the to-be-restored image by a preset filtering model, to obtain
blurred images corresponding to the to-be-restored image ⌇ 31

Obtain degrees of blurriness of the blurred images ⌇ 32

Determine a blurred image with a degree of blurriness exceeding a
blurriness threshold as the benchmark image corresponding to the restored
image ⌇ 33

FIG. 3

Obtain a preset path function, where the preset path function satisfies that
a starting image of a path is the benchmark image, and an ending image of
the path is the to-be-restored image ⌇ 41

Based on the to-be-restored image and the preset path function, obtain the
plurality of the interpolation images corresponding to the to-be-restored
image ⌇ 42

FIG. 4

FIG. 5

Obtain a gradient detection model corresponding to the target region, where the gradient detection model is configured to detect high-frequency information contained in an image region, and the larger a detection value, the stronger a restoration ability of the image inpainting model

~61

For each of the input image, obtain, by the gradient detection model, a detection value of the target region in the restored image corresponding to the input image as the attribution value

FIG. 7

Integrate the activation image corresponding to each of the input images to obtain a target activation image corresponding to the to-be-restored image　～91

Based on the target activation image, perform visual analysis on the restored image corresponding to the to-be-restored image, to obtain the visual analysis result　～92

VISUAL ANALYSIS METHODS AND APPARATUSES FOR IMAGE INPAINTING MODELS, AND ELECTRONIC DEVICES

CROSS-REFERENCE TO RELATED APPLICATIONS

This application is a national stage of international PCT Application No. PCT/CN2022/130284 filed on Nov. 7, 2022, the entire contents of which are incorporated herein by reference.

TECHNICAL FIELD

The present disclosure relates to the technical field of image processing, in particular to visual analysis methods and apparatuses for image inpainting models, and electronic devices.

BACKGROUND

Image inpainting is a popular research direction in the field of computer vision, aiming at restoring missing regions of damaged images. Existing image inpainting models are usually implemented using deep learning models. Functions of current deep learning models are relatively complex, including data collection and preprocessing, feature extraction and selection, modelling, and learning and evaluation, which makes the image inpainting models contain more and more model parameters and makes it difficult for researchers to understand the internal working mechanism of these complex models and makes the researchers usually treat the models as black boxes, therefore prolonging the design and training time of image inpainting models and reducing experience.

SUMMARY

The present disclosure provides visual analysis methods and apparatuses for image inpainting models, and electronic devices, to address shortcomings of relevant technologies.

According to the first aspect of embodiments of the present disclosure, a visual analysis method for an image inpainting model is provided, including:

obtaining a benchmark image corresponding to a to-be-restored image and a plurality of interpolation images corresponding to the to-be-restored image, where the to-be-restored image includes a target region to be restored;

respectively inputting the to-be-restored image, the benchmark image and the plurality of the interpolation images as input images into the image inpainting model, to obtain a restored image corresponding to each of the input images;

for each of the input images, obtaining an attribution value of the target region in the restored image corresponding to the input image, and based on the attribution value, obtaining an activation image corresponding to the input image, where the activation image includes a response value of each pixel in the input image contributing to the attribution value; and performing visual analysis based on the activation image corresponding to each of the input images and the restored image corresponding to the to-be-restored image, to obtain a visual analysis result.

In some embodiments, obtaining the benchmark image corresponding to the to-be-restored image includes:

filtering the to-be-restored image by a preset filtering model, to obtain blurred images corresponding to the to-be-restored image;

obtaining degrees of blurriness of the blurred images; and determining a blurred image with a degree of blurriness exceeding a blurriness threshold as the benchmark image corresponding to the restored image.

In some embodiments, obtaining the plurality of the interpolation images corresponding to the to-be-restored image includes:

obtaining a preset path function, where the preset path function satisfies that a starting image of a path is the benchmark image, and an ending image of the path is the to-be-restored image; and based on the to-be-restored image and the preset path function, obtaining the plurality of the interpolation images corresponding to the to-be-restored image, where the plurality of the interpolation images have different degrees of blurriness.

In some embodiments, for each of the input image, obtaining the attribution value of the target region in the restored image corresponding to the input image includes:

obtaining a gradient detection model corresponding to the target region, where the gradient detection model is configured to detect high-frequency information contained in an image region, and the larger a detection value, the stronger a restoration ability of the image inpainting model;

for each of the input image, obtaining, by the gradient detection model, a detection value of the target region in the restored image corresponding to the input image as the attribution value.

In some embodiments, performing visual analysis based on the activation image corresponding to each of the input images and the restored image corresponding to the to-be-restored image to obtain the visual analysis result includes:

integrating the activation image corresponding to each of the input images to obtain a target activation image corresponding to the to-be-restored image, where the target activation image is configured to represent a region of pixels of interest when the image inpainting model restores the to-be-restored image; and based on the target activation image, performing visual analysis on the restored image corresponding to the to-be-restored image, to obtain the visual analysis result.

In some embodiments, a response value of a pixel of interest in the target activation image is directly proportional to a degree of attention given to a position corresponding to the pixel of interest when the image inpainting model restores the to-be-restored image.

According to the second aspect of embodiments of the present disclosure, a visual analysis apparatus for an image inpainting model is provided, including:

a benchmark image obtaining module, configured to obtain a benchmark image corresponding to a to-be-restored image, where the to-be-restored image includes a target region to be restored;

an interpolation image obtaining module, configured to obtain a plurality of interpolation images corresponding to the to-be-restored image;

a restored image obtaining module, configured to input the to-be-restored image, the benchmark image and the plurality of the interpolation images as input images into the image inpainting model, to obtain a restored image corresponding to each of the input images;

an attribution value obtaining module, configured to obtain an attribution value of the target region in the restored image corresponding to each of the input images;

an activation image obtaining module, configured to, based on the attribution value, obtain an activation image corresponding to each of the input images, where the activation image includes a response value of each pixel in an input image contributing to the attribution value; and a visual result obtaining module, configured to perform visual analysis based on the activation image corresponding to each of the input images and the restored image corresponding to the to-be-restored image, to obtain a visual analysis result.

In some embodiments, the benchmark image obtaining module includes:

a blurred image obtaining submodule, configured to filter the to-be-restored image by a preset filtering model, to obtain blurred images corresponding to the to-be-restored image;

a blurriness obtaining submodule, configured to obtain degrees of blurriness of the blurred images; and a benchmark image determining submodule, configured to determine a blurred image with a degree of blurriness exceeding a blurriness threshold as the benchmark image corresponding to the restored image.

In some embodiments, the interpolation image obtaining module includes:

a path function obtaining submodule, configured to obtain a preset path function, where the preset path function satisfies that a starting image of a path is the benchmark image, and an ending image of the path is the to-be-restored image; and an interpolation image obtaining submodule, configured to, based on the to-be-restored image and the preset path function, obtain the plurality of the interpolation images corresponding to the to-be-restored image, where the plurality of the interpolation images have different degrees of blurriness.

In some embodiments, the attribution value obtaining module includes:

a gradient model obtaining submodule, configured to obtain a gradient detection model corresponding to the target region, where the gradient detection model is configured to detect high-frequency information contained in an image region, and the larger a detection value, the stronger a restoration ability of the image inpainting model;

a attribution value obtaining submodule, configured to, by the gradient detection model, obtain a detection value of the target region in a restored image corresponding to each of the input images as the attribution value.

In some embodiments, the visual result obtaining module includes:

a target image obtaining submodule, configured to integrate the activation image corresponding to each of the input images to obtain a target activation image corresponding to the to-be-restored image, where the target activation image is configured to represent a region of pixels of interest when the image inpainting model restores the to-be-restored image are located; and a visual result obtaining submodule, configured to, based on the target activation image, perform visual analysis on the restored image corresponding to the to-be-restored image, to obtain the visual analysis result.

In some embodiments, a response value of a pixel of interest in the target activation image is directly proportional to a degree of attention given to a position corresponding to the pixel of interest when the image inpainting model restores the to-be-restored image.

According to the third aspect of embodiments of the present disclosure, an electronic device is provided, including:

one or more memories and one or more processors, the one or more memories are configured to store a computer program that is executable by the one or more processors, and the one or more processors are configured to execute the computer program in the one or more memories, to implement the method according to the first aspect.

According to the fourth aspect of embodiments of the present disclosure, a non-transitory computer-readable storage medium is provided, where when an executable computer program in the storage medium is executed by a processor, the method according to the first aspect is implemented.

It is to be understood that the above general descriptions and the below detailed descriptions are merely exemplary and explanatory, and are not intended to limit the present disclosure.

BRIEF DESCRIPTION OF DRAWINGS

Accompanying drawings herein are incorporated into and constitute a part of the specification, illustrate embodiments consistent with the present disclosure, and are combined with the description to explain the principle of the present disclosure.

FIG. 1 is a flowchart of a visual analysis method for an image inpainting model according to an embodiment.

FIG. 2 is a schematic diagram of a to-be-restored image and a target region according to an embodiment.

FIG. 3 is a schematic diagram for obtaining a benchmark image according to an embodiment.

FIG. 4 is a flowchart for obtaining an interpolation image according to an embodiment.

FIG. 5 is a schematic diagram of a restored image for a to-be-restored image according to an embodiment.

FIG. 6 is a flowchart for obtaining an attribution value according to an embodiment.

FIG. 7 is a schematic diagram of an activation image according to an embodiment.

DETAILED DESCRIPTION

Figures 8, 9:
FIG. 8 is a schematic diagram of an activation image according to another embodiment.
FIG. 9 is a schematic diagram for obtaining a visual analysis activation image according to an embodiment.

Embodiments will be described in detail herein, examples of which are illustrated in the accompanying drawings. Where the following description refers to the drawings, elements with the same numerals in different drawings refer to the same or similar elements unless otherwise indicated. Embodiments described in the illustrative examples below are not intended to represent all embodiments consistent with the present disclosure. Rather, they are merely embodiments of devices consistent with some aspects of the present disclosure as recited in the appended claims. It should be noted that, without conflict, features in following embodiments can be combined with each other.

To address the aforementioned technical problems, in embodiments of the present disclosure, a visual analysis method and apparatus for an image inpainting model, an electronic device, and a storage medium are provided. An image inpainting task is to modify a to-be-restored region with holes (or unknown regions) into a true and complete image. For a to-be-restored target region, when the target region is restored, multiple reliable methods can be used to fill in a missing part, that is, objects of any color can be used to repair an unknown or deleted part. In other words, restoring the target region is not to recover an image of the target region to the original, but rather generating a satisfactory replacement image. Therefore, in technical solutions of the present disclosure, it is found which pixels in an input image have a significant impact on a restoring result, that is, what is a reason for a specific restoring result. In other words, an inventive concept of the present disclosure is to find a region of interest when restoring an image using an image inpainting model, which facilitates visual analysis of the image inpainting model by combining the region of interest with a restored region in a restored image.

FIG. 1 is a flowchart of a visual analysis method for an image inpainting model according to an embodiment. Referring to FIG. 1, a visual analysis method for an image inpainting model, which can be applied to an electronic device, includes steps 11 to 15. In step 11, a benchmark image and a plurality of interpolation images corresponding to a to-be-restored image are obtained, where the to-be-restored image includes a to-be-restored target region.

In this embodiment, the electronic device can obtain the to-be-restored image, as shown in FIG. 2. The to-be-restored image refers to an original image including the to-be-restored region. The to-be-restored region is referred to as a target region 21 in the following. It is understandable that the to-be-restored target region in the to-be-restored image may affect the viewing experience. The to-be-restored image can be I, $I \subset \mathbb{R}^{h \times w \times c}$, where h, w, and c respectively represent the height, width, and number of channels of the to-be-restored image. Taking a grayscale image as an example, a spatial domain of the grayscale image is represented as a two-dimensional matrix, where each matrix element represents a corresponding pixel intensity. Taking an RGB image as an example, the spatial domain of the RGB image is represented as a two-dimensional matrix with three channels of red, green, and blue.

In this embodiment, the electronic device can obtain the benchmark image corresponding to the to-be-restored image. In this embodiment, the benchmark image is achieved with an idea of attribution. The idea of attribution means that when a result is attributed to a cause, the absence of the cause is implicitly used as a benchmark to compare the outcomes. For image inpainting models, there is a natural benchmark in an input space that makes a prediction of the image inpainting model neutral. For an object classification task, when a benchmark image is black, the object classification model predicts that all categories are equally possible, that is, the prediction result is neutral. However, a black benchmark image is not suitable for the image inpainting task. The image inpainting task, as a low-level visual task, involves processing at a pixel level, while analysing a restoration effect depends on considerations of high-frequency components in a restored image, that is, whether the image inpainting model has restored the high-frequency components of the to-be-restored image. The high-frequency components of the to-be-restored image represent information such as edges and textures in the image.

Therefore, in this embodiment, the blurred image obtained by removing the high-frequency components from the to-be-restored image is used as the benchmark image.

As shown in FIG. 3, obtaining the benchmark image corresponding to the to-be-restored image by the electronic device includes steps 31 to 33.

In step 31, the to-be-restored image is filtered by a preset filtering model, to obtain blurred images corresponding to the to-be-restored image.

In this embodiment, the electronic device can store a preset filtering model. The preset filtering model can be a Gaussian convolutional model, and a size of a convolutional kernel of the Gaussian convolutional model can be adjusted, and as the size of the convolutional kernel increases, a blurring ability for the image becomes stronger.

In this embodiment, the electronic device can use the preset filtering model to filter and process the to-be-restored image, to obtain the blurred images corresponding to the to-be-restored image.

Considering that the definition of different to-be-restored images may be different, blurred images corresponding to the to-be-restored images may be different. In this case, the electronic device can perform step 32.

In step 32, degrees of blurriness of the blurred images are obtained.

In this embodiment, a degree of blurriness of a blurred image can be calculated through a grayscale variance algorithm. The grayscale variance algorithm is represented by the following equation.

$$\bar{g} = \frac{1}{N_x \times N_y} \sum_{x=1}^{N_x} \sum_{y=1}^{N_y} f(x, y); \tag{1}$$

$$s = \frac{1}{N_x \times N_y} \sum_{x=1}^{N_x} \sum_{y=1}^{N_y} (f(x, y) - \bar{g})^2; \tag{2}$$

In equations (1) and (2), x represents an abscissa, y represents an ordinate, f (x, y) represents a grayscale value of the pixel (x, y), Nx represents the row number of a pixel, Ny represents the column number of a pixel, $\bar{g}$ represents a grayscale average value, and s represents a grayscale variance.

It should be noted that the higher the degree of blurriness of a blurred image, the less high-frequency components in the blurred image, and the higher the degree of blurriness of the blurred image, the more high-frequency components in the blurred image. In some embodiments, the persons skilled in the art can also use a definition to represent the blurriness. A higher definition indicates that there are more high-frequency components in the blurred image, and a lower definition indicates that there are fewer high-frequency components in the blurred image. In a case that the degree of blurriness of the blurred image can be represented, corresponding solutions fall within the scope of protection of the present disclosure.

In step 33, a blurred image with a degree of blurriness exceeding a blurriness threshold is determined as the benchmark image corresponding to the restored image.

In this embodiment, the electronic device can store a blurriness threshold. For example, a value range of the blurriness threshold can be 5-20, which can be selected based on specific scenarios and is not limited here.

In this embodiment, the electronic device can compare the degree of blurriness of the blurred image with the blurriness threshold. When the degree of blurriness is greater than or equal to the blurriness threshold, the electronic device can determine that the blurred image with the degree of blurriness exceeding the blurriness threshold is the benchmark image corresponding to the restored image. When the degree of blurriness is less than the blurriness threshold, the electronic device can determine that the blurred image does not meet the requirements. In this case, the electronic device can increase the size of the convolutional kernel of the preset filtering model, such as modifying the convolutional kernel from 3*3 to 5*5, and repeat steps 21 to 23 until the benchmark image is obtained.

In this way, in this embodiment, by processing the to-be-restored image, a benchmark image that meets the above design concept can be obtained, which serves as a benchmark object for subsequent visual analysis.

In this embodiment, the electronic device can obtain multiple interpolation images corresponding to the to-be-restored image, as shown in FIG. 4, including steps 41 to 42.

In step 41, a preset path function is obtained, where the preset path function satisfies that a starting image of the path is the benchmark image, and an ending image of the path is the to-be-restored image.

In this embodiment, the electronic device can obtain a preset path function to avoid saturation issues in subsequent processing processes such as integrating the activation image. The inventive concept of this embodiment is to construct a path between the benchmark image and the to-be-restored image. The path can be expressed by a path function, i.e. the preset path function mentioned above. Then, sampling can be evenly performed on this path to form interpolation images. Moreover, the preset path function satisfies that the starting image of the path is the benchmark image and the ending image is the to-be-restored image. Alternatively, the degrees of blurriness of the interpolation images varies along this path, where the closer an interpolation image is to the benchmark image, the higher the degree of blurriness of the interpolation image, and the closer an interpolation image is to the to-be-restored image, the lower the degree of blurriness (i.e., the higher the definition) of the interpolation image. In an embodiment, the preset path function can be represented by equation (3) as follows.

$$\gamma(\alpha) = \omega(\sigma - \alpha\sigma) \otimes I; \tag{3}$$

In equation (3), I represents the to-be-restored image, $\otimes$ represents a convolution operation, a value range of $\alpha$ is $0<\alpha<1$, $\omega(\sigma)$ represents a Gaussian kernel with a convolution kernel size of $\sigma$, and $\gamma(\alpha)$ represents an interpolation image at $\alpha$ on the path. The preset path function satisfies $\gamma_{pb}(0)=I'$ and $\gamma_{pb}(1)=I$. I' represents the blurred image, i.e., the benchmark image.

In step 42, based on the to-be-restored image and preset path function, multiple interpolation images corresponding to the to-be-restored image are obtained, where the multiple interpolation images have different degrees of blurriness.

In this embodiment, the electronic device can sequentially obtain various sampling points of the preset path function. In this case, the electronic device can obtain multiple interpolation images corresponding to the to-be-restored image based on the to-be-restored image and the preset path function. Referring to equation (3), if a sampling point is determined, $\omega(\sigma-\alpha\sigma)$ is known, and the to-be-restored image I is also known, therefore the interpolation image $\gamma(\alpha)$ can be calculated through equation (3).

In this way, in this embodiment, by setting the path function, the interpolation images corresponding to the to-be-restored image are obtained, such that a distribution of degrees of blurriness of different interpolation images can be relatively uniform, which facilitates the subsequent determination of attribution features and avoids an occurrence of integral saturation that prevents the determination of attribution features subsequently.

In step 12, the to-be-restored image, the benchmark image and the interpolation images are input as input images into the image inpainting model, to obtain a restored image corresponding to each of the input images.

In this embodiment, an image inpainting model can be stored in the electronic device. The image inpainting model can include but is not limited to image inpainting algorithms based on convolutional self-encoding, GAN-based image inpainting algorithms and RNN-based image inpainting algorithms. In other words, the visual analysis method provided in this embodiment is used to analyse the image inpainting model, thus if an image can be restored, any inpainting model selected according to a specific scenario and the corresponding technical solution fall into the protection scope of the present disclosure.

In this embodiment, the electronic device can obtain the benchmark image, the to-be-restored image, and the multiple interpolation images, and input all of the above images as input images into the image inpainting model. The image inpainting model performs restoration processing on each input image and outputs the restored image. The restored image I1 meets $I1 \cup \mathbb{R}^{h \times w \times c}$. That is, the electronic device can obtain a corresponding restored image for each input image, as shown in an example of a restored image in FIG. 5. As shown in FIG. 5, a part within target region 21 matches surrounding steps.

In step 13, for each of the input images, an attribution value of the target region in the restored image corresponding to the input image is obtained.

Considering that when selecting the blurred image, the high-frequency components in the to-be-restored image are used as the attribution features, in this step, the presence of high-frequency components in the restored image is used as an attribution target. Therefore, the electronic device can obtain an attribution value corresponding to each input image. Referring to FIG. 6, the electronic device can obtain the attribution value of the target region in the restored image corresponding to each input image, including steps 61 to 62.

In step 61, a gradient detection model corresponding to the target region is obtained, where the gradient detection model is configured to detect high-frequency information contained in an image region, and the larger a detection value, the stronger a restoration ability of the image inpainting model.

In this embodiment, the electronic device stores a preset gradient detection model. The gradient detection model is configured to detect high-frequency information contained in an image region, and the larger a detection value, the stronger a restoration ability of the image inpainting model. In an example, the gradient detection model is $F_l(x, y)$:

$\mathbb{R}^{l \times l \times c}$, where l represents a patch size of a restored image corresponding to each input image, i.e., $F_l(x, y)$ represents the number of high-frequency components contained in a target region with (x, y) being a center and width and height being l. The larger the value of $F_l(x, y)$ (i.e., the detection value), the more high-frequency components in the target region, and indirectly, the stronger the restoration ability of the image inpainting model. That is, the electronic device can obtain a gradient detection model corresponding to the target region from a local memory.

In step 62, for each of the input image, by the gradient detection model, a detection value of the target region in the restored image corresponding to the input image is obtained as the attribution value.

In this embodiment, the electronic device can obtain, by the gradient detection model, a detection value of the target region in the restored images corresponding to each input image, and determine the detection value as the attribution value. For example, the electronic device can obtain pixel data of the target region in the restored image, and then calculate the detection value based on the pixel data and the gradient detection model.

In step 14, for each input image, based on the attribution value, an activation image corresponding to the input image is obtained, where the activation image includes a response value of each pixel in the input image contributing to the attribution value.

In this embodiment, after the attribution value of the target region in each restored image is determined, the electronic device can determine the response value of each pixel in the input image corresponding to each restored image according to a gradient back propagation. The response value can be understood as a contribution of each pixel in the input image to the target region in the restored image. Alternatively, based on the image inpainting model, according to a gradient back propagation, a weight value of each pixel in the input image corresponding to the attribution value of the target region in the restored image is determined. In this way, the electronic device can obtain the activation image corresponding to each input image, such as the activation image corresponding to the to-be-restored image as shown in FIG. 7. As shown in FIG. 7, the activation image illustrates the response value of each pixel, where arrows indicate several larger response values.

It should be noted that, as shown in FIG. 7, the response values corresponding to pixels are discrete, and the response values are also different. In FIG. 7, colors of different depths are used to represent the response values. For the convenience of visual analysis, in this embodiment, the activation image is smoothed. For example, smoothing process such as mean filtering, Gaussian filtering, median filtering, etc. can be performed on the response value of each pixel to obtain a smoother activation image shown in FIG. 8. As shown in FIG. 8, a change trend of the response values can be represented by color depth, which is more conducive to visual analysis.

In step 15, visual analysis is performed based on the activation image corresponding to each input image and the restored image corresponding to the to-be-restored image, to obtain a visual analysis result.

The visual analysis result is a region of pixels of interest when the image inpainting model restores the to-be-restored image, where the region of pixels of interest is determined by analysing a contribution of each pixel to a restoration result of the to-be-restored image.

In this embodiment, referring to FIG. 9, the electronic device can perform visual analysis based on the activation image corresponding to each input image and the restored image corresponding to the to-be-restored image, including steps 91 to 92.

In step 91, the electronic device can perform integration processing on the activation image corresponding to each input image (the integration processing is shown in equation (4)), to obtain a target activation image corresponding to the to-be-restored image. The target activation image can be seen in FIG. 8. The target activation image is configured to represent the region of pixels of interest when the image inpainting model restores the to-be-restored image.

$$PathIG_i(F, u, \gamma) = \int_{\alpha=0}^{1} \frac{\partial F(u(\gamma(\alpha)))}{\partial \gamma(\alpha)_i} \times \frac{\partial \gamma(\alpha)_i}{\partial \alpha} d\alpha; \quad (4)$$

In equation (4), PathIG represents a path gradient integral value, $PathIG_i$ represents a contribution value of pixel i, u represents the image inpainting model, $\gamma(\alpha)$ represents an interpolation image at $\alpha$ on the path, F represents an attribution function (obtaining the response value of each pixel on the input image based on the attribution value), $u(\gamma(\alpha))$ represents the restored image (i.e., the restored image I1) corresponding to the interpolation image. I is noted as the to-be-restored image and $\gamma(\alpha) = \omega(\sigma)DI$ is the blurred image, i.e., the benchmark image.

In step 92, the electronic device can perform visual analysis on the restored image corresponding to the to-be-restored image based on the target activation image, and obtain a visual analysis result.

In this embodiment, the electronic device can display the activation image and the restored image corresponding to each input image, and the user can perform visual analysis based on the activation image and the restored image.

Referring to FIGS. 7 and 8, the image inpainting model when restoring the target region of the to-be-restored image, focuses mainly on pixels around the target region of the to-be-restored image, which means that the pixels around the target region make a greater contribution to the target region in the restored image. That is, a response value of a pixel of interest in the target activation image is directly proportional to the degree of attention given to the position corresponding to the pixel of interest when the image inpainting model restores the to-be-restored image.

Figure 10:
FIG. 10 is a schematic diagram of a restored image for a to-be-restored image according to another embodiment.
Figure 11:
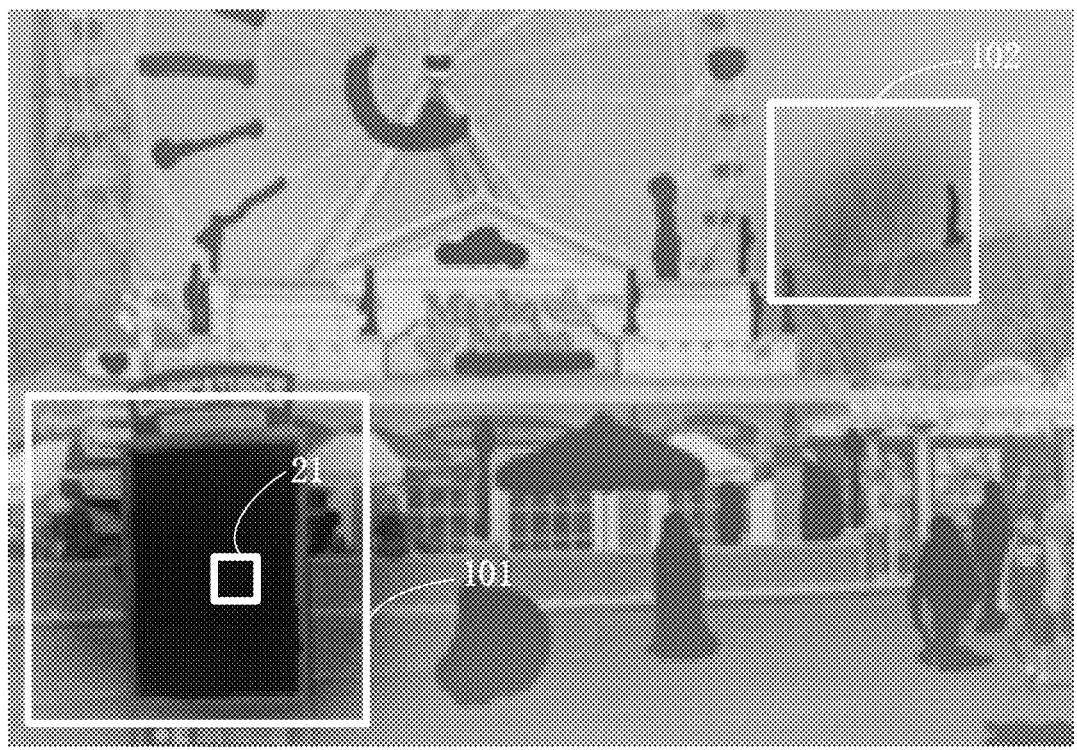
FIG. 11 is a schematic diagram of an activation image according to another embodiment.

Referring to FIGS. 10 and 11, another image inpainting model when restoring the target region 21 of the to-be-restored image, focuses mainly on pixels in surround 101 of the target region and the pixels in the upper-right-corner sky region 102. That is, the pixels around the target region and the pixels in the upper-right-corner sky region contribute more to the target region in the restored image. Based on visual analysis of the restored image and the target activation image, it can be found that different image inpainting models focus on different regions when inpainting the target region.

Therefore, in the technical solutions provided by the embodiments of the present disclosure, the benchmark image and the multiple interpolation images corresponding to the to-be-restored image can be obtained, where the to-be-restored image includes a to-be-restored target region.

Then, the to-be-restored image, the benchmark image, and the multiple interpolation images are input as input images into the image inpainting model to obtain the restored image corresponding to each of the input images. Afterwards, the attribution value of the target region in the restored image corresponding to each of the multiple input images is obtained. Furthermore, the activation image corresponding to each of the input images is obtained based on the attribution value, where the activation image includes a response value of each pixel in an input image contributing to the attribution value. Finally, based on the activation image corresponding to each input image and the restored image of the to-be-restored image, visual analysis is performed to obtain the visual analysis result. In this way, in this embodiment, by generating an activation image to perform visual analysis on the restored image, the image inpainting model can be verified, updated, or knowledge discovered, thereby shortening the design and development time and improving development efficiency.

Figure 12:
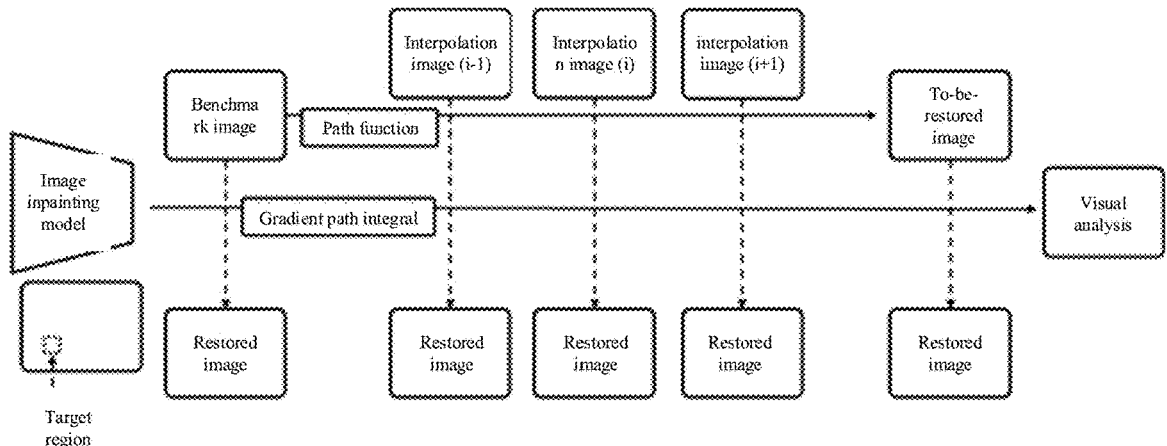
FIG. 12 is a flowchart of a visual analysis method for an image inpainting model according to another embodiment.

The following describes the implementation process of a visual analysis method for an image inpainting model in conjunction with the embodiment shown in FIG. 12.

The image inpainting model can be implemented using a deep learning network that utilizes gradient information.

The image inpainting model and the to-be-restored image are given, and a to-be-analysed region (i.e., the target region) is designated.

The to-be-restored image shown in FIG. 2 is input into the image inpainting model to obtain the restored image shown in FIG. 5.

A path is constructed between the benchmark image and the to-be-restored image, expressed by the path function, and sampling can evenly be performed along the path to form multiple interpolation images (i−1, i, i+1).

For each interpolation image on the path, the interpolation image is input into the image inpainting model to obtain the corresponding restored image.

The attribution target $F_i(x, y)$ is constructed for the to-be-analyzed region (i.e. the region position corresponding to the target region, or the restored region) of each restored image, and the attribution value is obtained.

The activation image as shown in FIG. 7 or FIG. 8 corresponding to each restored image is obtained based on the attribution value.

By integrating all activation images through a gradient integration path, visual analysis is obtained.

Figure 13:
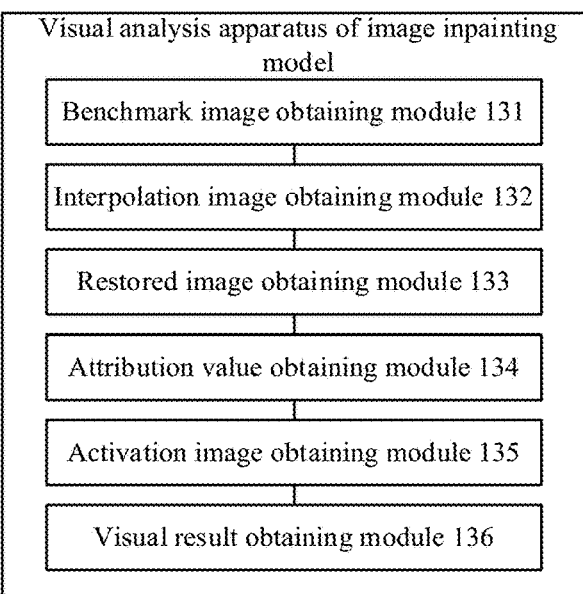
FIG. 13 is a block diagram of a visual analysis apparatus for an image inpainting model according to an embodiment.

On the basis of the visual analysis method for the image inpainting model provided in the embodiments of the present disclosure, the embodiments of the present disclosure further provide a visual analysis apparatus of an image inpainting model, applied to electronic devices, as shown in FIG. 13. The apparatus includes:

a benchmark image obtaining module 131, configured to obtain a benchmark image corresponding to a to-be-restored image, where the to-be-restored image includes a target region to be restored;

an interpolation image obtaining module 132, configured to obtain a plurality of interpolation images corresponding to the to-be-restored image;

a restored image obtaining module 133, configured to input the to-be-restored image, the benchmark image and the plurality of the interpolation images as input images into the image inpainting model, to obtain a restored image corresponding to each of the input images;

an attribution value obtaining module 134, configured to obtain an attribution value of the target region in the restored image corresponding to each of the input images;

an activation image obtaining module 135, configured to, based on the attribution value, obtain an activation image corresponding to each of the input images, where the activation image includes a response value of each pixel in an input image contributing to the attribution value; and a visual result obtaining module 136, configured to perform visual analysis based on the activation image corresponding to each of the input images and the restored image corresponding to the to-be-restored image, to obtain a visual analysis result.

In an embodiment, the benchmark image obtaining module includes:

a blurred image obtaining submodule, configured to filter the to-be-restored image by a preset filtering model, to obtain a blurred image corresponding to the to-be-restored image;

a blurriness obtaining submodule, configured to obtain a degree of blurriness of the blurred image; and a benchmark image determining submodule, configured to determine a blurred image with a degree of blurriness exceeding a blurriness threshold as the benchmark image corresponding to the restored image.

In an embodiment, the interpolation image obtaining module includes:

a path function obtaining submodule, configured to obtain a preset path function, where the preset path function satisfies that a starting image of a path is the benchmark image, and an ending image of the path is the to-be-restored image; and an interpolation image obtaining submodule, configured to, based on the to-be-restored image and the preset path function, obtain the plurality of the interpolation images corresponding to the to-be-restored image, where the plurality of the interpolation images have different degrees of blurriness.

In an embodiment, the attribution value obtaining module includes:

a gradient model obtaining submodule, configured to obtain a gradient detection model corresponding to the target region, where the gradient detection model is configured to detect high-frequency information contained in an image region, and the larger a detection value, the stronger a restoration ability of the image inpainting model;

a attribution value obtaining submodule, configured to, by the gradient detection model, obtain a detection value of the target region in a restored image corresponding to each of the input images as the attribution value.

In an embodiment, the visual result obtaining module includes:

a target image obtaining submodule, configured to integrate the activation image corresponding to each of the input images to obtain a target activation image corresponding to the to-be-restored image, where the target activation image is configured to represent a region of pixels of interest when the image inpainting model restores the to-be-restored image; and a visual result obtaining submodule, configured to, based on the target activation image, perform visual analysis on the restored image corresponding to the to-be-restored image, to obtain the visual analysis result.

In an embodiment, a response value of a pixel of interest in the target activation image is directly proportional to a degree of attention given to a position corresponding to the pixel of interest when the image inpainting model restores the to-be-restored image.

It should be noted that the content of the apparatus embodiments in the present disclosure match the content of the above method embodiments, and can refer to the content of the above method embodiments, which is not repeated here.

Figure 14:
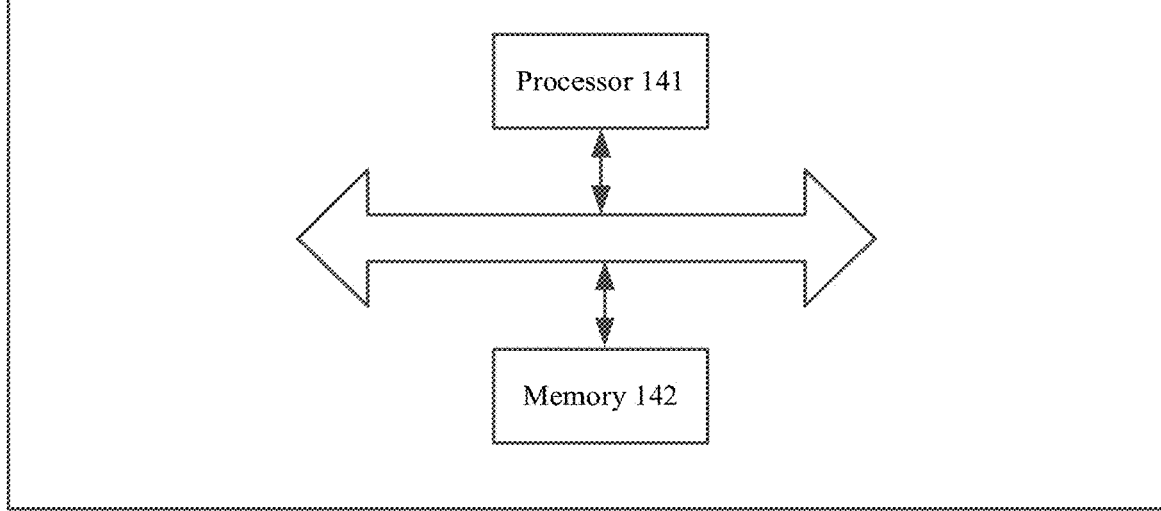
FIG. 14 is a block diagram of an electronic device according to an embodiment.

In an embodiment, referring to FIG. 14, an electronic device is further provided, including:

one or more memories 142 and one or more processors 141;

where the one or more memories are 142 configured to store a computer program that is executable by the one or more processors 141, and the one or more processors 141 are configured to execute the computer program in the one or more memories, to implement the method described above.

The technical solutions provided by the embodiments of the present disclosure can include following beneficial effects.

In the technical solutions provided by the embodiments of the present disclosure, the benchmark image and the multiple interpolation images corresponding to the to-be-restored image can be obtained, where the to-be-restored image includes a to-be-restored target region. Then, the to-be-restored image, the benchmark image, and the multiple interpolation images are input as input images into the image inpainting model to obtain the restored image corresponding to each of the input images. Afterwards, the attribution value of the target region in the restored image corresponding to each of the multiple input images is obtained. Furthermore, the activation image corresponding to each of the input images is obtained based on the attribution value, where the activation image includes a response value of each pixel in an input image contributing to the attribution value. Finally, based on the activation image corresponding to each input image and the restored image of the to-be-restored image, visual analysis is performed to obtain the visual analysis result. In this way, in this embodiment, by generating an activation image to perform visual analysis on the restored image, the image inpainting model can be verified, updated, or knowledge discovered, thereby shortening the design and development time and improving development efficiency.

In embodiments, a non-transitory computer-readable storage medium is further provided, such as a memory including instructions, where the executable computer program can be executed by a processor. The readable storage medium may be a Read-Only Memory (ROM), a Random Access Memory (RAM), a CD-ROM, a magnetic tape, a floppy disk and an optical data storage device, etc.

After considering and practicing the disclosure of the specification, other embodiments of the present disclosure will be readily apparent to those skilled in the art. The present disclosure is intended to cover any modification, use or adaptation of the present disclosure. These modifications, uses or adaptations follow the general principles of the present disclosure and include common knowledge and conventional technical means in the technical field that are not disclosed in the present disclosure. The specification and embodiments herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The invention claimed is:

1. A method, comprising:

obtaining a benchmark image corresponding to a to-be-restored image and a plurality of interpolation images corresponding to the to-be-restored image, wherein the to-be-restored image comprises a target region to be restored;

respectively inputting the to-be-restored image, the benchmark image and the plurality of the interpolation images as input images into an image inpainting model, to obtain a restored image corresponding to each of the input images;

for each of the input images, obtaining an attribution value of the target region in the restored image corresponding to the input image, and based on the attribution value, obtaining an activation image corresponding to the input image, wherein the activation image comprises a response value of each pixel in the input image contributing to the attribution value; and performing visual analysis based on the activation image corresponding to each of the input images and the restored image corresponding to the to-be-restored image, to obtain a visual analysis result;

wherein obtaining the benchmark image corresponding to the to-be-restored image comprises:

filtering the to-be-restored image by a preset filtering model, to obtain blurred images corresponding to the to-be-restored image;

obtaining degrees of blurriness of the blurred images; and determining a blurred image with a degree of blurriness exceeding a blurriness threshold as the benchmark image corresponding to the restored image;

wherein the degrees of blurriness of the blurred images can be calculated by:

$$\bar{g} = \frac{1}{N_x \times N_y} \sum_{x=1}^{N_x} \sum_{y=1}^{N_y} f(x, y), \text{ and}$$

$$s = \frac{1}{N_x \times N_y} \sum_{x=1}^{N_x} \sum_{y=1}^{N_y} (f(x, y) - \bar{g})^2,$$

wherein x represents an abscissa, y represents an ordinate, f (x, y) represents a grayscale value of a pixel (x, y), Nx represents a row number of the pixel, Ny represents a column number of the pixel, $\bar{g}$ represents a grayscale average value, and s represents a grayscale variance;

wherein obtaining the plurality of the interpolation images corresponding to the to-be-restored image comprises:

based on the to-be-restored image and an preset path function, obtaining the plurality of the interpolation images corresponding to the to-be-restored image, wherein the plurality of the interpolation images have different degrees of blurriness; wherein the preset path function satisfies that a starting image of a path is the benchmark image, and an ending image of the path is the to-be-restored image;

wherein the preset path function is represented by:

$\gamma(\alpha)=\omega(\sigma-\alpha\sigma)\otimes I;$ wherein I represents the to-be-restored image, $\otimes$ represents a convolution operation, a value range of $\alpha$ is $0<\alpha<1$, $\omega(\sigma)$ represents a Gaussian kernel with a convolution kernel size of $\sigma$, and $\gamma(\alpha)$ represents an interpolation image at $\alpha$ on the path, wherein the preset path function satisfies $\gamma_{pb}(0)=I'$ and $\gamma_{pb}(1)=I$, and $I'$ represents the blurred image;

wherein obtaining the attribution value comprises:

by a gradient detection model, a detection value of the target region in the restored image corresponding to the input image as the attribution value; wherein the gradient detection model is configured to detect high-frequency information contained in an image region;

wherein the gradient detection model is $F_l(x, y)$:

$\mathbb{R}^{l\times l\times c}$, where 1 represents a patch size of a restored image corresponding to each input image, $F_l(x, y)$ represents a number of high-frequency components contained in a target region with (x, y) being a center and width and height being I, wherein the larger the value of $F_l(x, y)$, the more high-frequency components in the target region;

wherein performing the visual analysis comprises:

integrating the activation image corresponding to each of the input images to obtain a target activation image corresponding to the to-be-restored image, wherein the target activation image represents a region of pixels of interest when the image inpainting model restores the to-be-restored image; and based on the target activation image, performing visual analysis on the restored image corresponding to the to-be-restored image, to obtain the visual analysis result;

wherein the integration is performed by:

$$PathIG_i(F, u, \gamma) = \int_{\alpha=0}^{1} \frac{\partial F(u(\gamma(\alpha)))}{\partial \gamma(\alpha)_i} \times \frac{\partial \gamma(\alpha)_i}{\partial \alpha} d\alpha;$$

wherein PathIG represents a path gradient integral value, $PathIG_i$ represents a contribution value of pixel i, u represents an image inpainting model, $\gamma(\alpha)$ represents an interpolation image at $\alpha$ on the path, F represents an attribution function wherein a response value of each pixel on an input image is obtained based on the attribution value, $u(\gamma(\alpha))$ represents the restored image corresponding to the interpolation image.

2. The method according to claim 1, wherein a response value of a pixel of interest in the target activation image is directly proportional to a degree of attention given to a position corresponding to the pixel of interest when the image inpainting model restores the to-be-restored image.

3. A electronic device, comprising:

one or more memories and one or more processors, wherein the one or more memories are configured to store a computer program that is executable by the one or more processors, and the one or more processors are configured to execute the computer program in the one or more memories, to implement a method, the method comprising:

obtaining a benchmark image corresponding to a to-be-restored image and a plurality of interpolation images corresponding to the to-be-restored image, wherein the to-be-restored image comprises a target region to be restored;

respectively inputting the to-be-restored image, the benchmark image and the plurality of the interpolation images as input images into an image inpainting model, to obtain a restored image corresponding to each of the input images;

for each of the input images, obtaining an attribution value of the target region in the restored image corresponding to the input image, and based on the attribution value, obtaining an activation image corresponding to the input image, wherein the activation image comprises a response value of each pixel in the input image contributing to the attribution value; and performing visual analysis based on the activation image corresponding to each of the input images and the restored image corresponding to the to-be-restored image, to obtain a visual analysis result;

wherein obtaining the benchmark image corresponding to the to-be-restored image comprises:

filtering the to-be-restored image by a preset filtering model, to obtain blurred images corresponding to the to-be-restored image;

obtaining degrees of blurriness of the blurred images; and determining a blurred image with a degree of blurriness exceeding a blurriness threshold as the benchmark image corresponding to the restored image;

wherein the degrees of blurriness of the blurred images can be calculated by:

$$\bar{g} = \frac{1}{N_x \times N_y} \sum_{x=1}^{N_x} \sum_{y=1}^{N_y} f(x, y), \text{ and}$$

$$s = \frac{1}{N_x \times N_y} \sum_{x=1}^{N_x} \sum_{y=1}^{N_y} (f(x, y) - \bar{g})^2,$$

wherein x represents an abscissa, y represents an ordinate, f (x, y) represents a grayscale value of a pixel (x, y), Nx represents a row number of the pixel, Ny represents a column number of the pixel, $\bar{g}$ represents a grayscale average value, and s represents a grayscale variance;

wherein obtaining the plurality of the interpolation images corresponding to the to-be-restored image comprises:

based on the to-be-restored image and an preset path function, obtaining the plurality of the interpolation images corresponding to the to-be-restored image, wherein the plurality of the interpolation images have different degrees of blurriness; wherein the preset path function satisfies that a starting image of a path is the benchmark image, and an ending image of the path is the to-be-restored image;

wherein the preset path function is represented by:

$\gamma(\alpha)=\omega(\sigma-\alpha\sigma)\otimes I;$ wherein I represents the to-be-restored image, $\otimes$ represents a convolution operation, a value range of $\alpha$ is $0<\alpha<1$, $\omega(\sigma)$ represents a Gaussian kernel with a convolution kernel size of $\sigma$, and $\gamma(\alpha)$ represents an interpolation image at $\alpha$ on the path, wherein the preset path function satisfies $\gamma_{pb}(0)=I'$ and $\gamma_{pb}(1)=I$, and $I'$ represents the blurred image;

wherein obtaining the attribution value comprises:

by a gradient detection model, a detection value of
the target region in the restored image correspond-
ing to the input image as the attribution value;
wherein the gradient detection model is config-
ured to detect high-frequency information con-
tained in an image region;
wherein the gradient detection model is $F_l(x, y)$:

$\mathbb{R}^{l \times l \times c}$, where l represents a patch size of a
restored image corresponding to each input image,
$F_l(x, y)$ represents a number of high-frequency
components contained in a target region with (x,
y) being a center and width and height being I,
wherein the larger the value of $F_l(x, y)$, the more
high-frequency components in the target region;
wherein performing the visual analysis comprises:
integrating the activation image corresponding to each
of the input images to obtain a target activation
image corresponding to the to-be-restored image,
wherein the target activation image represents a
region of pixels of interest when the image inpaint-
ing model restores the to-be-restored image; and
based on the target activation image, performing visual
analysis on the restored image corresponding to the
to-be-restored image, to obtain the visual analysis
result;
wherein the integration is performed by:

$$PathIG_i(F, u, \gamma) = \int_{\alpha=0}^{1} \frac{\partial F(u(\gamma(\alpha)))}{\partial \gamma(\alpha)_i} \times \frac{\partial \gamma(\alpha)_i}{\partial \alpha} d\alpha;$$

wherein PathIG represents a path gradient integral
value, $PathIG_i$ represents a contribution value of
pixel i, u represents an image inpainting model, $\gamma(\alpha)$
represents an interpolation image at $\alpha$ on the path, F
represents an attribution function wherein a response
value of each pixel on an input image is obtained
based on the attribution value, $u(\gamma(\alpha))$ represents the
restored image corresponding to the interpolation
image.
4. A non-transitory computer-readable storage medium,
with an executable computer program stored therein,
wherein when the executable computer program in the
storage medium is executed by a processor, a method is
implemented, wherein the method comprising:
obtaining a benchmark image corresponding to a to-be-
restored image and a plurality of interpolation images
corresponding to the to-be-restored image, wherein the
to-be-restored image comprises a target region to be
restored;
respectively inputting the to-be-restored image, the
benchmark image and the plurality of the interpolation
images as input images into an image inpainting model,
to obtain a restored image corresponding to each of the
input images;
for each of the input images,
obtaining an attribution value of the target region in the
restored image corresponding to the input image, and
based on the attribution value, obtaining an activation
image corresponding to the input image, wherein the
activation image comprises a response value of each
pixel in the input image contributing to the attribu-
tion value; and
performing visual analysis based on the activation image
corresponding to each of the input images and the restored image corresponding to the to-be-restored
image, to obtain a visual analysis result;
wherein obtaining the benchmark image corresponding to
the to-be-restored image comprises:
filtering the to-be-restored image by a preset filtering
model, to obtain blurred images corresponding to the
to-be-restored image;
obtaining degrees of blurriness of the blurred images;
and
determining a blurred image with a degree of blurriness
exceeding a blurriness threshold as the benchmark
image corresponding to the restored image;
wherein the degrees of blurriness of the blurred images
can be calculated by:

$$\bar{g} = \frac{1}{N_x \times N_y} \sum_{x=1}^{N_x} \sum_{y=1}^{N_y} f(x, y), \text{ and}$$

$$s = \frac{1}{N_x \times N_y} \sum_{x=1}^{N_x} \sum_{y=1}^{N_y} (f(x, y) - \bar{g})^2,$$

wherein x represents an abscissa, y represents an ordi-
nate, f (x, y) represents a grayscale value of a pixel
(x, y), Nx represents a row number of the pixel, Ny
represents a column number of the pixel, $\bar{g}$ repre-
sents a grayscale average value, and s represents a
grayscale variance;
wherein obtaining the plurality of the interpolation images
corresponding to the to-be-restored image comprises:
based on the to-be-restored image and an preset path
function, obtaining the plurality of the interpolation
images corresponding to the to-be-restored image,
wherein the plurality of the interpolation images
have different degrees of blurriness; wherein the
preset path function satisfies that a starting image of
a path is the benchmark image, and an ending image
of the path is the to-be-restored image;
wherein the preset path function is represented by:

$\gamma(\alpha) = \omega(\sigma - \alpha\sigma) \otimes I;$ wherein I represents the to-be-restored image, $\otimes$ rep-
resents a convolution operation, a value range of $\alpha$ is
$0 < \alpha < 1$, $\omega(\sigma)$ represents a Gaussian kernel with a
convolution kernel size of $\sigma$, and $\gamma(\alpha)$ represents an
interpolation image at a on the path, wherein the
preset path function satisfies $\gamma_{pb}(0)=I'$ and $\gamma_{pb}(1)=I$,
and I' represents the blurred image;
wherein obtaining the attribution value comprises:
by a gradient detection model, a detection value of
the target region in the restored image correspond-
ing to the input image as the attribution value;
wherein the gradient detection model is config-
ured to detect high-frequency information con-
tained in an image region;
wherein the gradient detection model is $F_l(x, y)$:

$\mathbb{R}^{l \times l \times c}$, where l represents a patch size of a
restored image corresponding to each input image,
$F_l(x, y)$ represents a number of high-frequency
components contained in a target region with (x,
y) being a center and width and height being I,
wherein the larger the value of $F_l(x, y)$, the more
high-frequency components in the target region;
wherein performing the visual analysis comprises:
integrating the activation image corresponding to each
of the input images to obtain a target activation
image corresponding to the to-be-restored image, wherein the target activation image represents a region of pixels of interest when the image inpainting model restores the to-be-restored image; and based on the target activation image, performing visual analysis on the restored image corresponding to the to-be-restored image, to obtain the visual analysis result;

wherein the integration is performed by:

$$PathIG_i(F, u, \gamma) = \int_{\alpha=0}^{1} \frac{\partial F(u(\gamma(\alpha)))}{\partial \gamma(\alpha)_i} \times \frac{\partial \gamma(\alpha)_i}{\partial \alpha} d\alpha;$$

wherein PathIG represents a path gradient integral value, $PathIG_i$ represents a contribution value of pixel i, u represents an image inpainting model, $\gamma(\alpha)$ represents an interpolation image at $\alpha$ on the path, F represents an attribution function wherein a response value of each pixel on an input image is obtained based on the attribution value, $u(\gamma(\alpha))$ represents the restored image corresponding to the interpolation image.

5. The electronic device according to claim 4, wherein a response value of a pixel of interest in the target activation image is directly proportional to a degree of attention given to a position corresponding to the pixel of interest when the image inpainting model restores the to-be-restored image.

6. The storage medium according to claim 4, wherein obtaining the benchmark image corresponding to the to-be-restored image comprises:

filtering the to-be-restored image by a preset filtering model, to obtain blurred images corresponding to the to-be-restored image;

obtaining degrees of blurriness of the blurred images; and determining a blurred image with a degree of blurriness exceeding a blurriness threshold as the benchmark image corresponding to the restored image.

7. The storage medium according to claim 6, wherein obtaining the plurality of the interpolation images corresponding to the to-be-restored image comprises:

based on the to-be-restored image and a preset path function, obtaining the plurality of the interpolation images corresponding to the to-be-restored image, wherein the plurality of the interpolation images have different degrees of blurriness; wherein the preset path function satisfies that a starting image of a path is the benchmark image, and an ending image of the path is the to-be-restored image.

8. The storage medium according to claim 4, wherein obtaining the attribution value comprises:

by a gradient detection model, a detection value of the target region in the restored image corresponding to the input image as the attribution value; wherein the gradient detection model is configured to detect high-frequency information contained in an image region.

9. The storage medium according to claim 4, wherein performing the visual analysis comprises:

integrating the activation image corresponding to each of the input images to obtain a target activation image corresponding to the to-be-restored image, wherein the target activation image represents a region of pixels of interest when the image inpainting model restores the to-be-restored image; and based on the target activation image, performing visual analysis on the restored image corresponding to the to-be-restored image, to obtain the visual analysis result.

10. The storage medium according to claim 9, wherein a response value of a pixel of interest in the target activation image is directly proportional to a degree of attention given to a position corresponding to the pixel of interest when the image inpainting model restores the to-be-restored image.

11. The method according to claim 1, wherein the visual analysis result is a region of pixels of interest when the image inpainting model restores the to-be-restored image, where the region of pixels of interest is determined by analysing a contribution of each pixel to a restoration result of the to-be-restored image.

12. The electronic device according to claim 3, wherein the visual analysis result is a region of pixels of interest when the image inpainting model restores the to-be-restored image, where the region of pixels of interest is determined by analysing a contribution of each pixel to a restoration result of the to-be-restored image.

* * * * *